(12) United States Patent　　　　　(10) Patent No.:　US 12,652,446 B2
Ramu et al.　　　　　　　　　　　　(45) Date of Patent:　　Jun. 9, 2026

(54) SITUATIONAL MEDIA INTEGRATION

(71) Applicant: MOTOROLA SOLUTIONS, INC.,
　　　　　　　　Chicago, IL (US)

(72) Inventors: Shivakumar Bangalore Ramu,
　　　　　　　　Weston, FL (US); Jesus F. Corretjer,
　　　　　　　　Weston, FL (US)

(73) Assignee: MOTOROLA SOLUTIONS, INC.

( * ) Notice:　Subject to any disclaimer, the term of this
　　　　　　　patent is extended or adjusted under 35
　　　　　　　U.S.C. 154(b) by 103 days.

(21) Appl. No.: 18/899,651

(22) Filed:　　Sep. 27, 2024

(65)　　　　　Prior Publication Data

US 2026/0095636 A1　　Apr. 2, 2026

(51) Int. Cl.
　　　*H04N 21/8547*　　　(2011.01)
　　　*G06F 3/01*　　　　(2006.01)
　　　*G06F 40/289*　　　(2020.01)
(52) U.S. Cl.
　　　CPC ......... *H04N 21/8547* (2013.01); *G06F 3/017*
　　　　　　(2013.01); *G06F 40/289* (2020.01)
(58) Field of Classification Search
　　　CPC .... H04N 21/8547; G06F 40/289; G06F 3/017
　　　See application file for complete search history.

(56)　　　　　References Cited

U.S. PATENT DOCUMENTS

| | | | |
|---|---|---|---|
| 8,253,527 | B2 * | 8/2012 | Yang .................... G06V 40/113 |
| | | | 704/274 |
| 8,577,593 | B2 | 11/2013 | Oesterling et al. |
| 9,497,585 | B1 | 11/2016 | Cooley et al. |
| 11,195,408 | B1 * | 12/2021 | Sommerlatt ......... G08B 25/016 |
| 11,501,091 | B2 | 11/2022 | Dhawan |
| 11,507,758 | B2 | 11/2022 | Makke et al. |
| 11,721,355 | B2 | 8/2023 | Eubank et al. |
| 2015/0271655 | A1 * | 9/2015 | Jatavallabhula ........ H04W 4/90 |
| | | | 455/404.1 |
| 2018/0324300 | A1 | 11/2018 | Banaudha et al. |

(Continued)

FOREIGN PATENT DOCUMENTS

| | | |
|---|---|---|
| CN | 110533750 A | 12/2019 |
| IN | 402CHE2015 | 8/2016 |

(Continued)

OTHER PUBLICATIONS

Sensory, "Sound Identification & Speaker Verification", 2024, sensory. com, Retrieved from the Internet on Jul. 23, 2024 from URL: https://www.sensory.com/sound-identification/#:~text=Accurately Iden-tify Sounds%2C %26, specific sounds in an environment.

*Primary Examiner* — Mulugeta Mengesha
(74) *Attorney, Agent, or Firm* — Perry + Currier

(57)　　　　　　ABSTRACT

A method for situational media integration for telecommunication is described. The method comprises receiving media input and obtaining ambient media along with the received media input. One or more timestamps are applied to the received media input. One or more timestamps are applied to the ambient media. The one or more timestamps are used to synchronize the received media input with the ambient media to create a synchronized media stream. The synchronized media stream is transmitted to recipient devices. A device comprising a processor; and a computer-readable storage medium having stored thereon program instructions that, when executed by the processor, causes the processor to perform the method is also described.

18 Claims, 5 Drawing Sheets

(56) References Cited

U.S. PATENT DOCUMENTS

| | | | |
|---|---|---|---|
| 2019/0164406 A1 | 5/2019 | Werner et al. | |
| 2020/0135005 A1* | 4/2020 | Katz ................... | H04M 7/0021 |
| 2023/0104182 A1 | 4/2023 | Torres Hinojosa et al. | |
| 2023/0334258 A1 | 10/2023 | Thadisetty et al. | |
| 2025/0071203 A1* | 2/2025 | Pope ..................... | H04N 7/188 |

FOREIGN PATENT DOCUMENTS

| | | |
|---|---|---|
| IN | 202241015448 | 4/2022 |
| IN | 202221037757 | 7/2022 |
| IN | 202441014887 | 3/2024 |
| JP | 2004254218 A | 9/2004 |
| JP | 2005197889 A | 7/2005 |

* cited by examiner

400

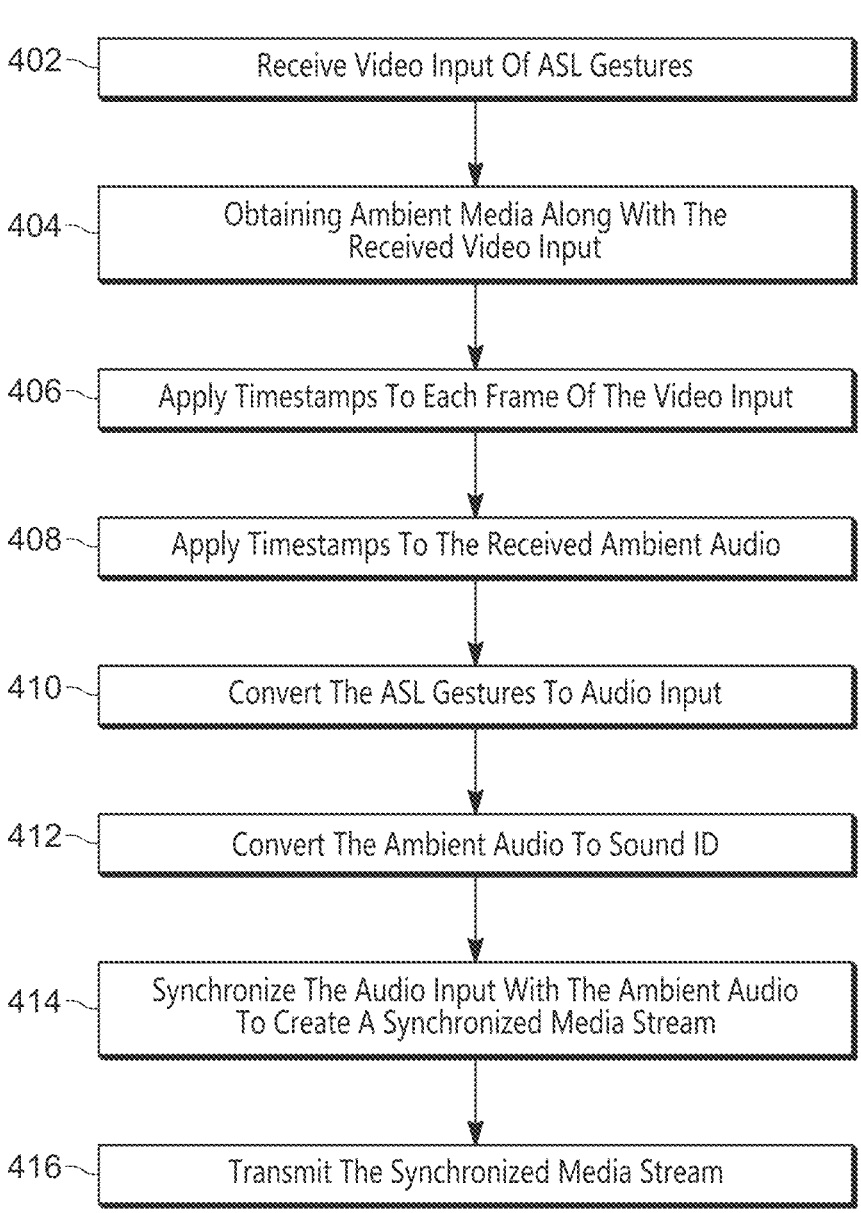

402 — Receive Video Input Of ASL Gestures

404 — Obtaining Ambient Media Along With The Received Video Input

406 — Apply Timestamps To Each Frame Of The Video Input

408 — Apply Timestamps To The Received Ambient Audio

410 — Convert The ASL Gestures To Audio Input

412 — Convert The Ambient Audio To Sound ID

414 — Synchronize The Audio Input With The Ambient Audio To Create A Synchronized Media Stream 416 — Transmit The Synchronized Media Stream

FIG. 4

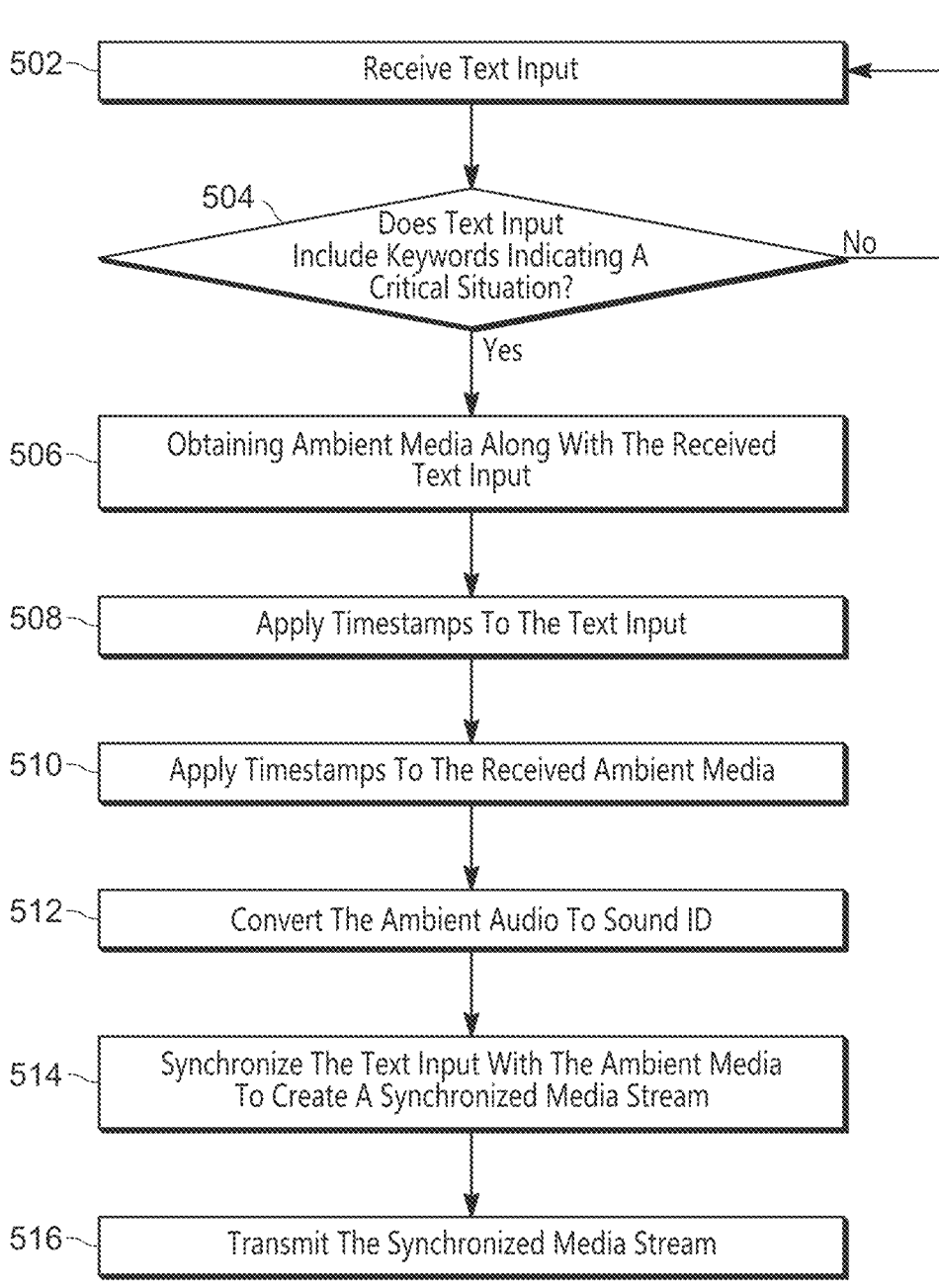

500

502 — Receive Text Input

504 — Does Text Input Include Keywords Indicating A Critical Situation?

No

Yes

506 — Obtaining Ambient Media Along With The Received Text Input

508 — Apply Timestamps To The Text Input

510 — Apply Timestamps To The Received Ambient Media

512 — Convert The Ambient Audio To Sound ID

514 — Synchronize The Text Input With The Ambient Media To Create A Synchronized Media Stream 516 — Transmit The Synchronized Media Stream

SITUATIONAL MEDIA INTEGRATION

The present specification relates generally to media processing and specifically to a device, method, and system for situational media integration for telecommunication.

BACKGROUND

In high-stress emergency situations such as school lockdowns, terrorist attacks, or other crises, effective and discreet communication is critical for safety and coordination. However, both text-based communication and systems supporting American Sign Language (ASL) users face significant technical challenges. Text-based methods, while discreet, often fail to provide critical information to responders. Similarly, individuals who rely on ASL, including first responders with hearing impairments, encounter barriers in current communication systems, which do not fully accommodate their needs for clear, real-time coordination. These combined technical limitations undermine the effectiveness of communication during emergencies, potentially jeopardizing safety and response efforts.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 4 is a flowchart of a method for situational media integration for video input capturing ASL gestures, in accordance with some examples.

FIG. 5 is a flowchart of a method for situational media integration for text input, in accordance with some examples.

Figure 1:
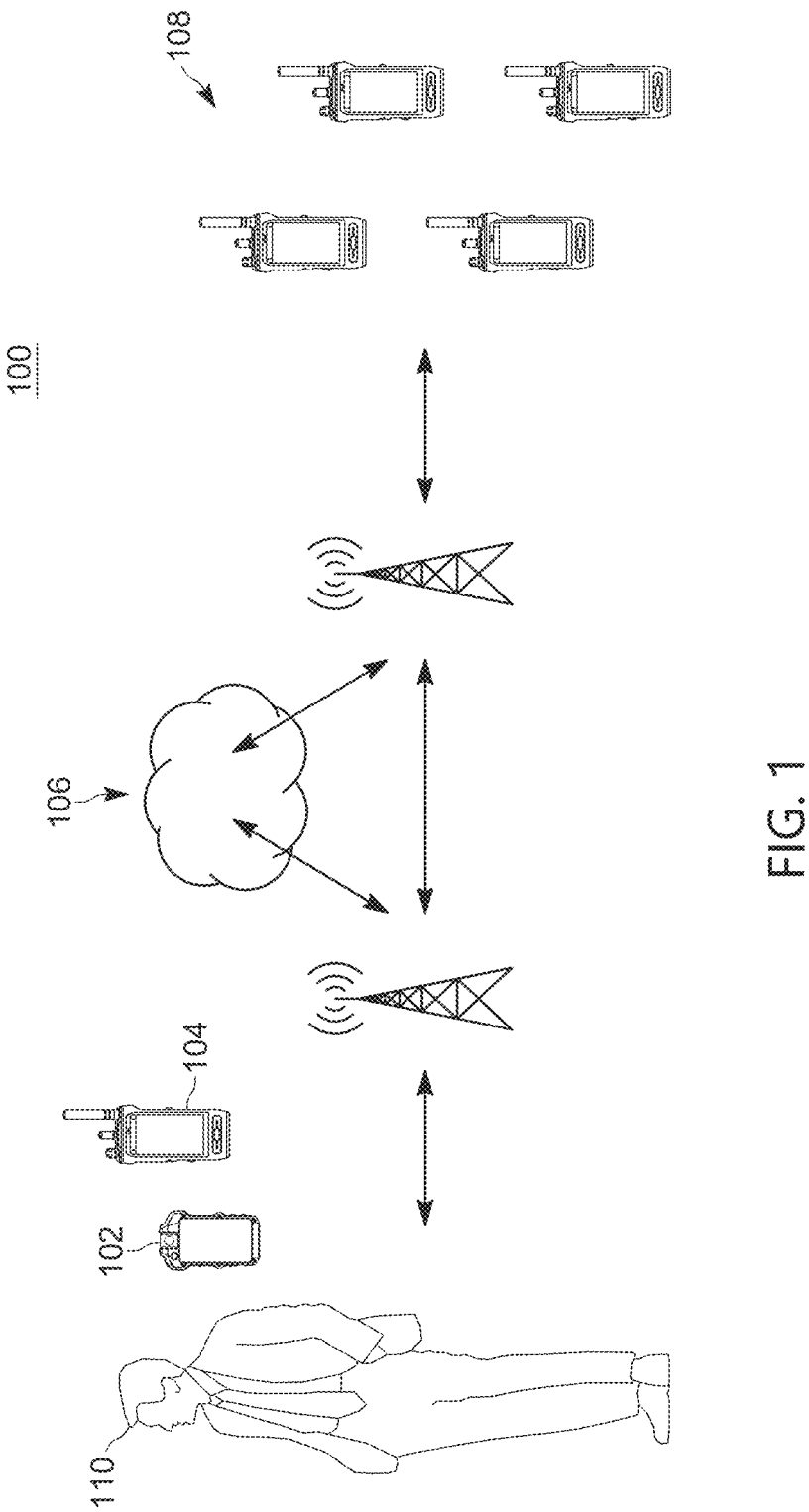
FIG. 1 is a system for situational media integration, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Current communication devices used by first responders, such as body-worn cameras (BWCs), augmented reality devices, radios, mobile communication devices, and the like, may inefficiently communicate messages, especially ASL interpreted messages. Specifically, the communication devices often fail to convey critical background information such as environmental images, noises or sounds that could provide situational awareness to dispatchers or emergency responders. This inefficiency may result in suboptimal performance of the communication devices, reducing the effectiveness of first responders in critical situations. Thus, there exists a need for an improved technical method, device, and system for real-time situational media integration including critical background media.

In accordance with an aspect of the present specification, there is provided a method comprising: receiving media input; obtaining ambient media along with the received media input; applying one or more timestamps to the received media input; applying one or more timestamps to the ambient media; using the one or more timestamps to synchronize the received media input with the ambient media to create a synchronized media stream; and transmitting the synchronized media stream.

In accordance with another aspect of the present specification, there is provided a device comprising: a processor; and a computer-readable storage medium having stored thereon program instructions that, when executed by the controller, causes the controller to perform a set of operations comprising: receiving media input; obtaining ambient media along with the received media input; applying one or more timestamps to the received media input; applying one or more timestamps to the ambient media; using the one or more timestamps to synchronize the received media input with the ambient media to create a synchronized media stream; and transmitting the synchronized media stream.

In some embodiment, the media input may comprise text input and the ambient media may comprise at least one of ambient audio and ambient video. The text input may be analyzed for keywords suggestive of a critical situation. In response to identifying keywords suggestive of a critical situation, at least one of an audio input device and a camera may be activated to record ambient audio and ambient video, respectively. The timestamp of the received text input may be synchronized with the timestamp at least one of the one ambient audio and the ambient video to create synchronization information.

The synchronized media stream may comprise the synchronization information along with the received text input and at least one of the ambient audio and the ambient video. The ambient audio may be associated with one or more unique identifiers configured to identify the ambient audio. The synchronized media stream may comprise the synchronization information along with the received text input and the one or more unique identifiers.

The text input may be converted to audio input. The converted audio input may be mixed with the ambient audio to create the synchronized media stream.

The media input may comprise video input capturing ASL gestures and the ambient media may comprise ambient audio. The ASL gestures in the video input may be converted to audio input and the timestamp from the video input may be correlated with associated converted audio input. At least one audio input device may be used to obtain the ambient audio. The timestamp of the converted audio input may be synchronized with the timestamp of the ambient audio to create synchronization information.

The video input may comprise both video and audio data and the ambient audio may be extracted from the video input.

The video input may be captured in real-time in response to an activation trigger, the activation trigger comprising a physical trigger or detection of the ASL gestures.

The ambient audio may be associated with one or more unique identifiers configured to identify the ambient audio, wherein the synchronized media stream comprises the synchronization information along with the converted audio input and the one or more unique identifiers. The converted audio input may be mixed with the ambient audio to create the synchronized media stream.

Each of the above-mentioned embodiments will be discussed in more detail below, starting with example system and device architectures of the system in which the embodiments may be practiced, followed by an illustration of processing blocks for achieving an improved technical method, device, and system for situational media integration.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring to FIG. 1, an example system for real-time situational media integration is illustrated generally by numeral 100. The system 100 may include a peripheral device 102, a communication device 104, a communication network 106, and one or more recipient devices 108. The communication device 104 is used by a user 110 for transmitting data to the recipient devices 108.

The peripheral device 102 is separate from and communicatively coupled to the communication device 104. In some embodiments, the peripheral device includes a camera and/or a microphone. For example, the peripheral device 102 can be a body worn camera (BWC). The body worn camera 102 may be wired or wirelessly coupled to the communication device 104. In some embodiments, the camera and microphone are part of the communication device 104, and the peripheral device is not necessary. In some embodiments, the peripheral device is used even if the camera and microphone are part of the communication device 104.

In some embodiments, the communication device 104 is a radio. For example, the communication device 104 can be an APX™ radio by Motorola Solutions, Inc. In some embodiments, the communication device 104 is a smart device. For example, the communication device 104 can be a smart phone, tablet, or other internet-connected device such as a smartwatch.

In some embodiments, the communication network 106 includes fixed network equipment (FNE) for radio communication. The FNE may include a trunked radio system, operable to assign frequency channels. The FNE may include any transmission system operable to receive, relay, and transmit electronic signals. The radio 104 can transmit a talk group call to the FNE via a channel. The radio 104 may transmit the talk group call, using a variety of applications. For example, the radio 104 may transmit the talk group call based on a push to talk (PTT) in application. The PTT application may be activated when a user employs an interface, such as pressing and holding a button.

In some embodiments, the communication network 106 includes a mobile network. The mobile network includes wireless broadband technologies to facilitate communication over wireless wide area networks (WWANs) and/or wireless local area networks (WLANs). WWANs use mobile communication technologies like 3G, 4G LTE, 5G, 6G and the like to connect devices to a network, such as the Internet. WLANs use radio waves to connect the devices to the network. At present this is typically done using the IEEE 802.11 Wi-Fi standards.

The recipient devices 108 are structurally similar to, if not the same as, the communication device 104. Thus, in some embodiments the recipient devices 108 include radios. In some embodiments, the recipient devices 108 include smart devices.

Figure 2:
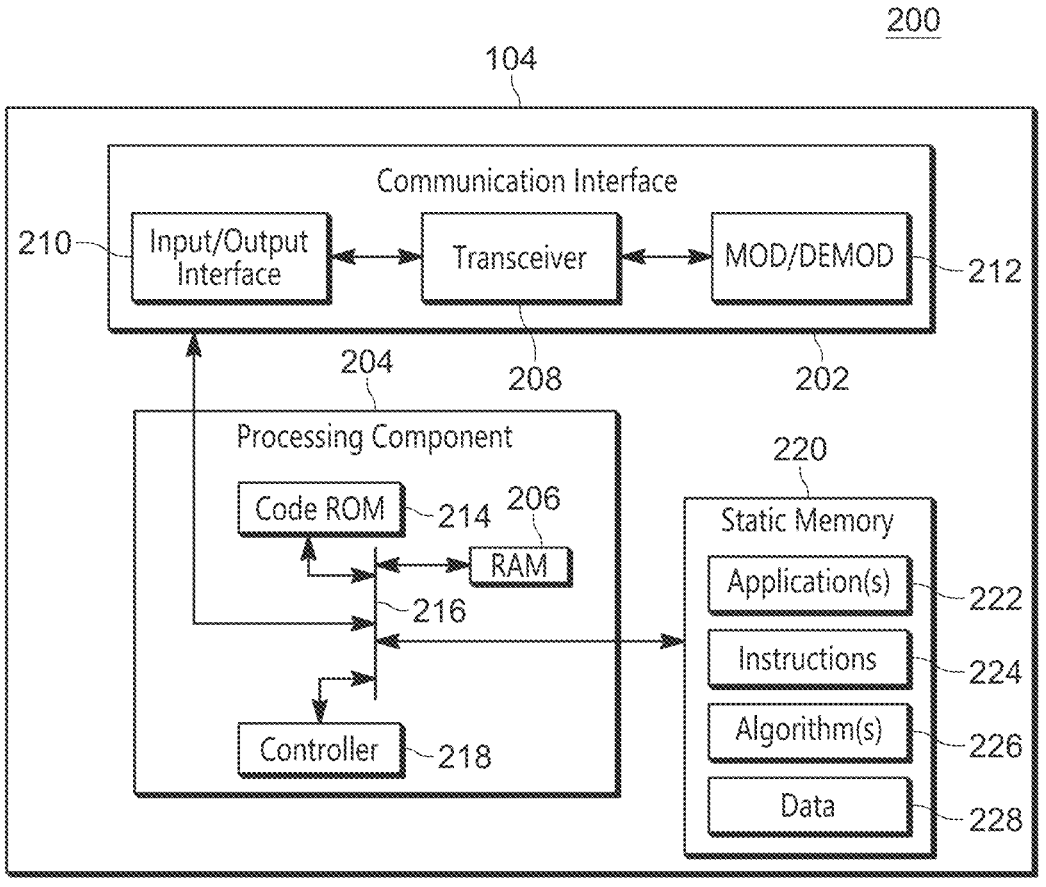
FIG. 2 is a device diagram showing a device structure of a device for situational media integration, in accordance with some examples.

Referring to FIG. 2, a schematic block diagram of an example of the communication device 104 is illustrated generally by numeral 200. The communication device 104 may include a communication interface 202, a processing component 204, and a memory 220.

The communication interface 202 includes one or more transceivers 208, input/output (I/O) interfaces 210, and modems 212. The I/O interfaces 210 may include one or more wired and/or wireless interfaces that are configurable to communicate with suitable components of the communication device 104 and the peripheral device 102. For example, the I/O interfaces 210 may interface with the peripheral device 102, a touchscreen, keypad, camera, and/or or microphone of the communication device 104.

The one or more transceivers 208 may be adapted for communication with the communication network 106 for communicating with the recipient devices 108. For example, the one or more transceivers 208 may be adapted for communication with one or more of the Internet, a Bluetooth network, a Wi-Fi network, for example operating in accordance with the IEEE 802.11 standards, an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include a cell phone transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to the modem 212.

The processing component 204 may include a Read Only Memory (ROM) 214, a Random Access Memory (RAM) 206, a common data and address bus 216 and a controller 218. The ROM 214, the RAM 206, and the controller 218 are communicatively coupled to the common data and address bus 216. Further, the communication interface 202 and the memory 220 are communicatively coupled to the processing component 204 via the common data and address bus 216.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device.

The memory 220 provides a non-transitory computer readable medium for storing machine readable instructions to implement one or more programs or applications 222, instructions or program code 224, algorithms 226, and/or application data 228. While the instruction or program code, 224, algorithms 226, and the application data 228 are shown as being separate from the applications 222, they may be components of the applications 222.

Figure 3:
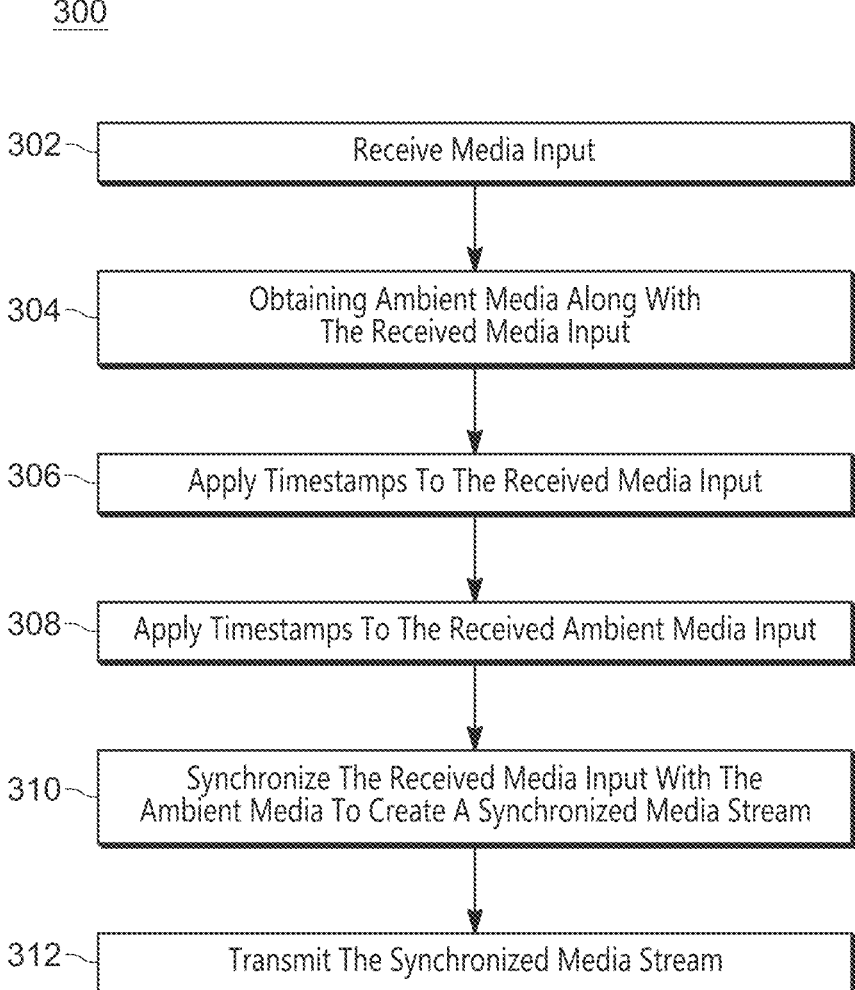
FIG. 3 is a flowchart of a method for situational media integration, in accordance with some examples.

Thus, for example, the memory 220 stores instructions and/or program code 224 and/or algorithms 226 and/or data 228 corresponding to the at least one application 222 that, when executed by the controller 218, enables the controller 218 to implement functionality for real-time situational media integration, including but not limited to, the blocks of the method set forth in FIG. 3 to FIG. 5.

Put another way, the memory 220 may comprise a non-transitory computer-readable storage medium having stored thereon program instructions that, when executed by the controller 218, cause the controller 218 to perform a set of operations comprising the blocks of the method set forth in FIG. 3 to FIG. 5.

The application and/or one or more of the algorithms 222 may include programmatic algorithms, and the like, to implement functionality as described herein.

Alternatively, and/or in addition to programmatic algorithms, the application and/or the one or more of the algorithms may include one or more machine learning algorithms to implement functionality as described herein.

The one or more machine learning algorithms of the application and/or the algorithms may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, in examples where the application and/or the one or more of the algorithms includes one or more machine learning algorithms, the application and/or the one or more of the algorithms may be operated in a training mode to train the application and/or the one or more of the algorithms to implement the functionality described herein.

Referring to FIG. 3 to FIG. 5, flowcharts representative of methods for situational media integration are illustrated. The operation of the methods corresponds to machine readable instructions that are executed by the controller 218 and/or at least one communication device 104. In the illustrated examples, the instructions represented by the blocks are stored at the memory 220 for example, as the application and/or the algorithms 222. The methods are some ways in which the controller 218 and/or the at least one communication device 104 and/or the system 100 may be configured. Furthermore, the following discussion of the methods will lead to a further understanding of the system 100 and its various components.

The methods need not be performed in the exact sequence as shown and likewise various blocks may be performed in parallel rather than in sequence. Accordingly, the elements of the methods are referred to herein as "blocks" rather than "steps". The methods may be implemented on variations of the system 100 of FIG. 1, as well.

Furthermore, in the description of the methods, reference is made to at least one computing device performing the method as functionality indicated by the method may be performed in a distributed manner.

Referring to FIG. 3, a flowchart representative of a general method for situational media integration is illustrated generally by numeral 300. At block 302, the communication device 104 receives media input from the user 110. At block 304, the communication device 104 obtains ambient media along with the received media input. In some embodiments, the ambient media includes media in formats other than the media input. For example, if the media input is text the ambient media may include at least one of audio and video. Similarly, if the media input is video the ambient media may include audio data. The ambient media is obtained by activating at least one of the microphone and the camera on at least one of the communication device 104 and the peripheral device.

At block 306 one or more timestamps are applied to the received media input. In some embodiments, each unit of media input is timestamped. Thus, if the media input is text for example, a timestamp is applied to each text message. Similarly, if the media input is video for example, a timestamp is applied to each video clip in the video input. In some embodiments, individual subunits of the media input are timestamped. Thus, if the media input is video for example, a timestamp can be applied to each frame in the video input. Applying timestamps to individual subunits of the media input allows the ambient media to be better synchronized with the media input.

At block 308, one or more timestamps are applied to the ambient media. In some embodiments, each unit of ambient media input is timestamped. Thus, if the ambient media is audio for example, a timestamp is applied to each audio clip. Alternatively, a timestamp may be applied to each distinctive sound within the audio clip. Similarly, if the ambient media is video for example, a timestamp is applied to each video clip. In some embodiments, individual subunits of the ambient media are timestamped. Thus, if the ambient media is audio for example, a timestamp can be applied to predefined segments of each audio clip based on the segment length. Similarly, if the ambient media is video for example, a timestamp is applied to each frame in the video clip. Applying timestamps to portions of the ambient media allows the ambient media to be better synchronized with the media input.

At block 310, the one or more timestamps are used to synchronize the media input with the ambient media to create a synchronized media stream. For example, the timestamped media input and the timestamped ambient media are placed into a buffer. In some embodiments, the buffer is a short buffer of approximately one to two seconds. A synchronization algorithm aligns the buffered media input with the buffered ambient media based on their timestamps, ensuring they are as closely temporally aligned as possible.

At block 312, the communication device transmits the synchronized media stream to the communication network 106 for distribution to the recipient devices 108.

The method 300 described with reference to FIG. 3 can be used to improve communication from first responders who rely on ASL as their primary mode of communication. In addition to translating the ASL to text or voice, the method 300 provides background information such as environmental images, noises or sounds that could provide situational awareness to dispatchers or other emergency responders.

Referring to FIG. 4, a flowchart representative of a method for situational media integration for users 110 who are first responders is illustrated generally by numeral 400.

At block 402, the communication device 104 receives media input from the first responder 110. The media input comprises video input capturing ASL gestures.

The video input is captured in real-time in response to an activation trigger. In some embodiments, the activation trigger comprises a physical trigger such as a button, for example. The first responder 110 presses and releases a push-to-talk button on the communication device 104 to activate capturing the ASL gestures. The button activates the camera on the communication device 104 or the body worn camera 102. The button also activates an ASL translation application. The first responder 110 performs ASL gestures to convey their message. The video input is received until the conversation ends. The end of the conversation can be determined by a lack of gestures being detected after a predefined amount of time. Alternatively, the end of the conversation can be determined by the user pressing and releasing the push-to-talk button a second time.

In some embodiments, the activation trigger is the detection of the ASL gestures. The communication device 104 is configured to automatically activate capturing ASL gestures, when ASL gestures are detected by the camera. Such activation can provide a handsfree mode for the first responder

110. Detection of the ASL gestures also activates the ASL translation application. The first responder 110 performs ASL gestures to convey their message. The video input is received until the conversation ends. The end of the conversation is determined by a lack of gestures being detected after a predefined amount of time.

At block 404, at least one audio input device is used to obtain the ambient audio. For example, the video input may not be captured with audio data since the ASL translation application may only require video data. Accordingly, the communication device 104 activates the microphone to record the audio data. If, however, the video input includes both video data and audio data, and the ambient audio can be extracted from the video input.

At block 406, one or more timestamps are applied to the received video input. As described with reference to FIG. 3, in some embodiments a timestamp is applied to each video clip in the video input. In some embodiments, a timestamp is applied to each frame in the video clip.

At block 408, one or more timestamps are applied to the ambient audio. As described with reference to FIG. 3, in some embodiments, a timestamp is applied to each audio clip in the ambient audio. Alternatively, a timestamp may be applied to each distinctive sound within the audio clip.

At block 410, the ASL gestures are converted from video to audio in real time. In some embodiments, the ASL gestures are converted directly from video to audio. In some embodiments, the ASL gestures are first converted from video to text and then converted to audio. As part of the conversion process, the timestamps from the video input are correlated with the associated synthesized audio input. That is, the original timestamps from the captured ASL gestures are kept intact when converting the gestures to text and/or voice.

At block 412, the ambient audio is optionally converted from audio data to text data. That is, the ambient audio is associated with one or more unique identifiers configured to identify the ambient audio. These unique identifiers are sometimes referred to as "sound ID". Sound ID refers to a unique text identifier assigned to a specific sound or audio clip within a database, application, or system. This text identifier allows for easy referral, retrieval, and management of sound files. For example, a fire truck siren in the ambient audio could be identified as "fire_truck_siren". To facilitate sound ID, the communication device 104 uses real-time processing to filter, identify, and categorize sounds in the ambient audio. Machine learning models can be used to classify background sounds, such as sirens, traffic, footsteps, conversations, animal noises, gun shots, and the like. The sound ID can be used by the recipient devices 108 to synthesize the sound or present a visual representation of the sound.

At block 414, the one or more timestamps are used to synchronize the converted audio input with the ambient audio to create a synchronized media stream. For example, the timestamped video input and the timestamped ambient audio are placed into a buffer. The synchronization algorithm aligns the buffered video input and the buffered ambient audio based on their timestamps, ensuring they are as closely temporally aligned as possible. The converted audio input may be mixed directly with the ambient audio. In some embodiments, the ambient audio is mixed at a lower volume than the audio input. In this manner, the ambient audio provides the critical background information without adversely impacting the clarity of the message from the first responder 110. Alternatively, if the ambient audio has been converted to sound ID, the sound ID text is synchronized with the converted audio input.

At block 416, the communication device transmits the synchronized media stream to the communication network 106 for distribution to the dispatchers or other emergency responders 108.

The method 300 described with reference to FIG. 3 can be also used to provide situation media integration for users 110 in high stress situations. For example, in school lockdowns, terrorist attacks, or other emergency scenarios, the users 110 often need to communicate discreetly to avoid detection and ensure their safety. Traditional voice-based communication methods can be risky as it may reveal the location of the individuals. While text-based communication is a safer alternative, it often fails to convey critical background information such as environmental noises or sounds that could provide situational awareness to dispatchers or emergency responders.

Referring to FIG. 5, a flowchart representative of a method for situational media integration for users 110 who are in high stress situations is illustrated generally by numeral 500.

At block 502, the communication device 104 receives media input from the user 110. The media input comprises one or more text messages. At block 504, a natural language processing (NLP) engine on the communication device 104 continuously analyzes the text messages in real-time for keywords suggestive of a critical situation. Thus, for example, the NLP engine is trained to detect specific keywords or phrases indicating that the user is or may be in a high stress or critical situation. Examples of keywords include "hiding," "intruder," "silent," "danger," and the like. The NLP engine monitors the text messages until it is determined that the user is likely in a high stress situation.

At block 506 the ambient media is obtained by the communication device 104. For example, the ambient media may include at least one of ambient video and ambient audio. If the ambient media includes ambient video, the communication device 104 activates the camera and the microphone. The camera records live video, ambient sounds and situational noises in the background. This ambient video provides additional context to the text message. In some embodiments, only the camera may be activated. If the ambient media includes ambient audio, the communication device 104 activates the microphone. The microphone records ambient sounds and situational noises in the background. This ambient audio provides additional context to the text message.

At block 508, one or more timestamps are applied to the received text input. At block 510, one or more timestamps are applied to the at least one of the ambient video and the ambient audio. As described with reference to FIG. 3, in some embodiments, a timestamp is applied to each audio clip in the ambient audio. Alternatively, a timestamp may be applied to each distinctive sound within the audio clip. Similarly, a timestamp may be applied to segments of the ambient video, such as each frame for example. Alternatively, a timestamp may be applied to each video clip within the ambient video.

At block 512, the ambient audio is optionally converted from audio data to text data. That is, the ambient audio is associated with one or more unique identifiers configured to identify the ambient audio, as described with reference to FIG. 4. The text messages are optionally converted to audio input. As part of the conversion process, the timestamps from the text messages are correlated with the synthesized audio input. That is, the original timestamps from the received text messages are kept intact when converting the text messages to voice.

At block 514, the one or more timestamps are used to synchronize the text messages with the at least one of the ambient video and the ambient audio to create synchronized information. For example, the timestamped text messages and the timestamped at least one of the ambient video and the ambient audio may be placed into a buffer. The synchronization algorithm aligns the buffered text message and at least one of the buffered ambient video and the buffered ambient audio based on their timestamps, ensuring they are as closely aligned in time as possible. The at least one of the ambient video and the ambient audio may be tagged and attached to the text message. If the ambient audio has been converted to sound ID, the sound ID text is attached to the text message. In some embodiments, the synchronized media stream includes the synchronization information between the text messages and the at least one of the ambient video and the ambient audio. If the text messages have been converted to audio input, the at least one of the ambient video and the ambient audio can be mixed with the synthesized audio input. In some embodiments, the ambient audio is mixed at a lower volume than the audio input. In this manner, the ambient audio provides the critical background information without adversely impacting the clarity of the message from the user 110.

At block 516, the communication device transmits the synchronized media stream to the communication network 106. The synchronized media stream is communicated to the intended recipient 108. In some embodiments, the synchronized media stream is also forwarded to an emergency dispatcher even if the emergency dispatcher is not the intended recipient 108.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot obtain ambient media for providing situational media integration in a communication system, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to three or more subsequently defined options such as "one of A, B, and C" should be construed to mean an existence of any one of the options in the list alone (e.g., A alone, B alone, or C alone) or any combination of the three or more of the options in the list (e.g., A and B and C together, A and B together, A and C together, or B and C together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving text input;

obtaining ambient media comprising at least one of ambient audio and ambient video along with the received text input;

applying one or more timestamps to the received text input;

analyzing the text input for keywords suggestive of a critical situation;

in response to identifying keywords suggestive of a critical situation, activating at least one of an audio input device to record the ambient audio and a camera to record the ambient video;

applying one or more timestamps to the ambient media;

using the one or more timestamps to synchronize the received text input with the ambient media to create synchronization information and a synchronized media stream; and transmitting the synchronized media stream.

2. The method of claim 1, wherein the synchronized media stream comprises the synchronization information along with the received text input and at least one of the ambient audio and the ambient video.

3. The method of claim 1 further comprising associating the ambient audio with one or more unique identifiers configured to identify the ambient audio, wherein the synchronized media stream comprises the synchronization information along with the received text input and the one or more unique identifiers.

4. The method of claim 1 further comprising:

converting the text input to audio input; and mixing the converted audio input with the ambient audio to create the synchronized media stream.

5. A device comprising:

a processor; and a computer-readable storage medium having stored thereon program instructions that, when executed by the processor, causes the processor to perform a set of operations comprising:

receiving text input;

obtaining ambient media comprising at least one of ambient audio and ambient video along with the received text input;

synchronizing the received text input and the ambient media by:

applying one or more timestamps to the received text input;

analyzing the text input for keywords suggestive of a critical situation;

in response to identifying keywords suggestive of a critical situation, activating at least one of an audio input device to record the ambient audio and a camera to record the ambient video;

applying one or more timestamps to the ambient media; and using the one or more timestamps to synchronize the received text input with the ambient media to create synchronization information and a synchronized media stream; and transmitting the synchronized media stream.

6. The device of claim 5, wherein the synchronized media stream comprises the synchronization information along with the received text input and at least one of the ambient audio and the ambient video.

7. The device of claim 5, the set of operations further comprising associating the ambient audio with one or more unique identifiers configured to identify the ambient audio, wherein the synchronized media stream comprises the synchronization information along with the received text input and the one or more unique identifiers.

8. The device of claim 5, the set of operations further comprising:

converting the text input to audio input; and mixing the converted audio input with the ambient audio to create the synchronized media stream.

9. A method comprising:

receiving video input capturing sign language gestures;

obtaining, using at least one audio input device ambient audio along with the received video input;

applying one or more timestamps to the received video input;

applying one or more timestamps to the ambient audio;

converting the sign language gestures in the video input to audio input, the timestamp from the video input being correlated with associated converted audio input;

using the one or more timestamps to synchronize the received video input with the ambient audio to create synchronization information and a synchronized media stream; and transmitting the synchronized media stream.

10. The method of claim 9, wherein the video input comprises both video and audio data, and ambient audio is extracted from the video input.

11. The method of claim 9, wherein the video input is captured in real-time in response to an activation trigger, the activation trigger comprising a physical trigger or detection of the sign language gestures.

12. The method of claim 9 further comprising associating the ambient audio with one or more unique identifiers configured to identify the ambient audio, wherein the synchronized media stream comprises the synchronization information along with the converted audio input and the one or more unique identifiers.

13. The method of claim 9 further comprising mixing the converted audio input with the ambient audio to create the synchronized media stream.

14. A device comprising:

a processor; and a computer-readable storage medium having stored thereon program instructions that, when executed by the processor, causes the processor to perform a set of operations comprising:

receiving video input capturing sign language gestures;

obtaining, using at least one audio input device ambient audio along with the received video input;

synchronizing the received video input and the ambient audio by:

applying one or more timestamps to the received video input;

applying one or more timestamps to the ambient audio;

converting the sign language gestures in the video input to audio input, the timestamp from the video input being correlated with associated converted audio input; and using the one or more timestamps to synchronize the received video input with the ambient audio to create synchronization information and a synchronized media stream; and transmitting the synchronized media stream.

15. The device of claim 14, wherein the video input comprises both video and audio data, and ambient audio is extracted from the video input.

16. The device of claim 14, wherein the video input is captured in real-time in response to an activation trigger, the activation trigger comprising a physical trigger or detection of the sign language gestures.

17. The device of claim 14, the set of operations further comprising associating the ambient audio with one or more unique identifiers configured to identify the ambient audio, wherein the synchronized media stream comprises the synchronization information along with the converted audio input and the one or more unique identifiers.

18. The device of claim 14, the set of operations further comprising mixing the converted audio input with the ambient audio to create the synchronized media stream.

* * * * *